June 7, 1960 G. E. BRIGGS 2,939,600

CIGARETTE PACKAGING

Filed April 4, 1958 2 Sheets-Sheet 1

INVENTOR.
GLENFORD E. BRIGGS
BY [signature]
ATT'Y.

INVENTOR.
GLENFORD E. BRIGGS

BY

ATT'Y.

United States Patent Office 2,939,600

Patented June 7, 1960

2,939,600

CIGARETTE PACKAGING

Glenford E. Briggs, 10 Cumberland St., Boston, Mass.

Filed Apr. 4, 1958, Ser. No. 726,464

3 Claims. (Cl. 216—29)

This invention relates to packaging of assemblies of objects. In particular it relates to a machine for applying pressure-sensitive tape to two opposite sides of a plurality of similar objects so as to provide a unitary package.

In recent years retailers have been dispensing cigarettes in units of five packages by applying strips of transparent pressure-sensitive tape to opposite sides of an assembly of five packages of cigarettes. However, hand-application of tape is time-consuming and costly, particularly in view of the small margin of profit.

One object of this invention is to provide a machine for rapidly applying pressure-sensitive tape to opposite sides of an assembly of similar packages, as, for example, cigarettes. Other objects and advantages of this invention appear in the description, drawing and claims which follow.

The invention comprises, generally, a pair of inwardly-pressing movable feed arms which form a passageway through which is pushed an array of packages to be taped. Each arm carriers on its passageway surface the lead edge of a continuous strip of pressure-sensitive tape. Pushing of the array between the moveable feed arms causes pressure on each lead edge and thus apply tape along each side of the array. Associated with the passageway are a pair of inwardly-pressing moveable cutting arms supporting knives at tape level. Initial entry of the package array separates these cutting arms so that after the array has passed through, the cutting arms are released, causing the knives to cut the tape, completing the cycle of operation.

The feed arms may be of varied construction, as, for example, spring-loaded pivoted arms. The cutting arms, spaced along the passageway formed by the feed arms, may also be of varied construction, as for example, spring-loaded pivoted arms mounted in appropriate recesses in the feed arms.

A preferred embodiment of this invention is described below with reference to the drawing, wherein.

Figure 1:
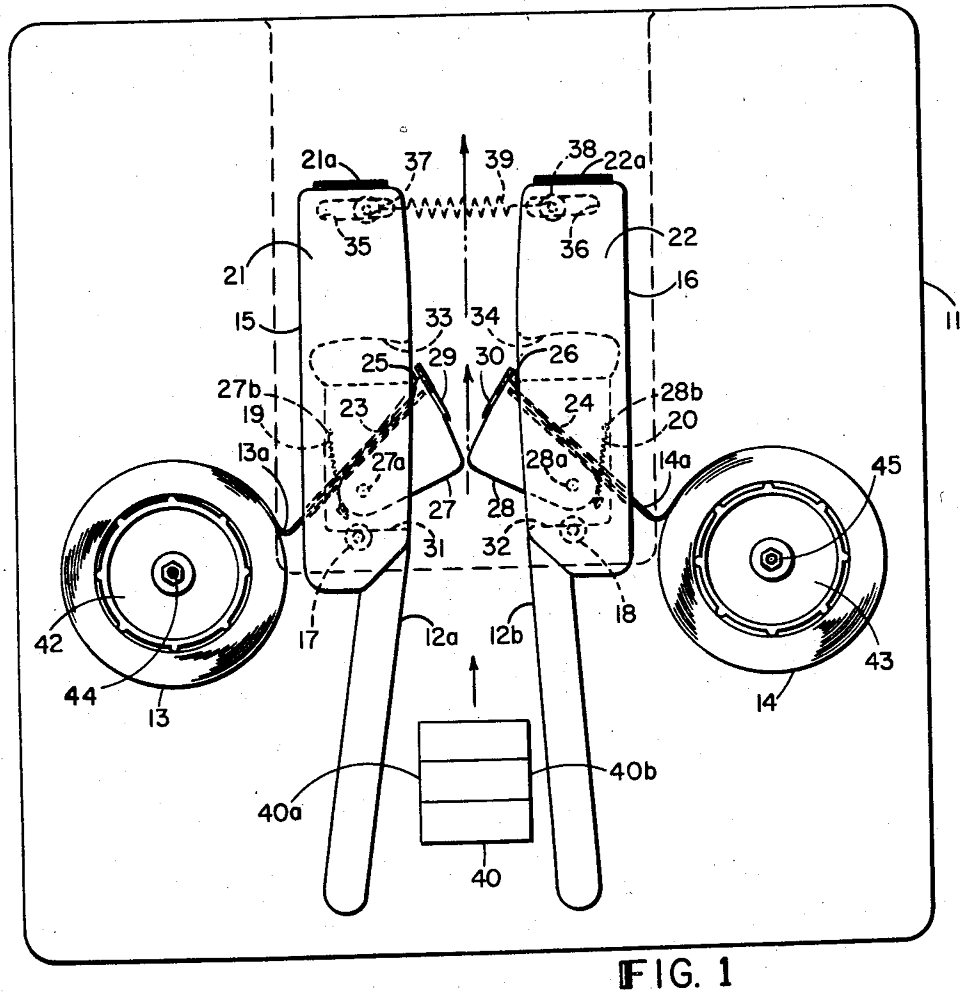
Fig. 1 is a plan view of the machine, showing an array of packages about to enter the passageway.
Figure 2:
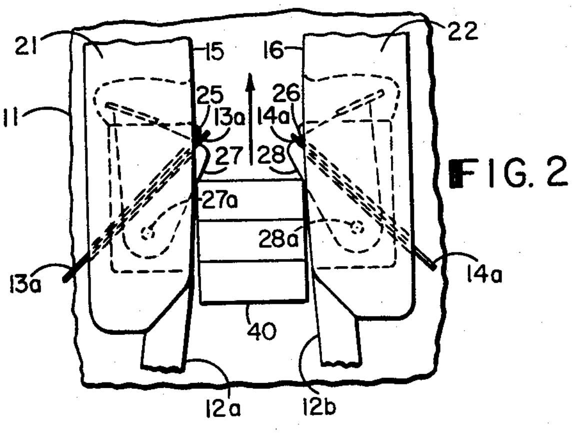
Fig. 2 is a partial plan view showing an array pushing back both the feed arms and knife-support arms.
Figure 3:
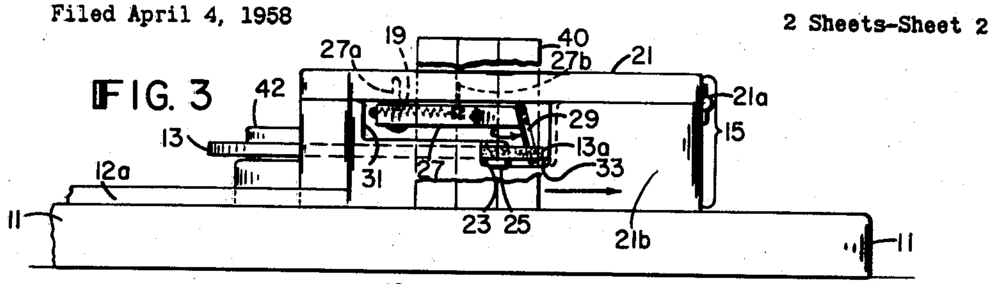
Fig. 3 is an inside partial elevation showing the array pushing back one feed arm and knife support.
Figure 4:
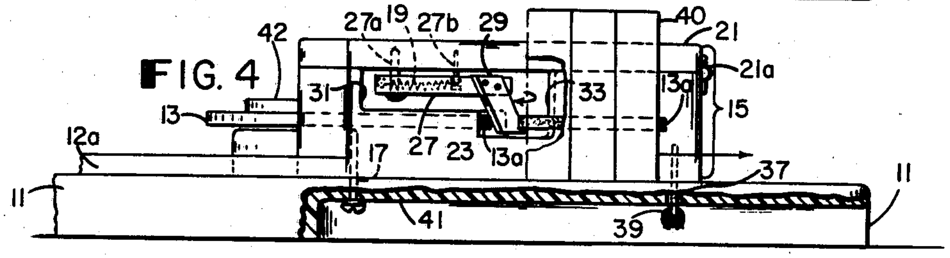
Fig. 4 is a similar view to Fig. 3 with knife support released and tape cut.
Figure 5:
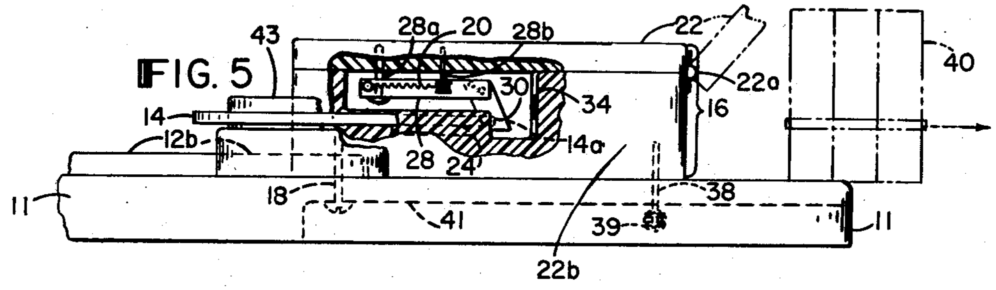
Fig. 5 is a partial elevation with cutaway showing the other feed arm and knife support with no array.
Figure 6:
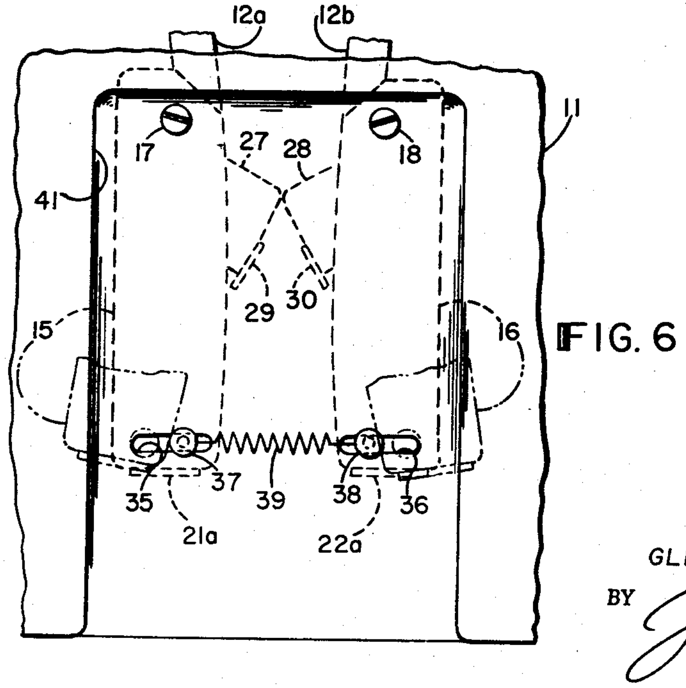
Fig. 6 is a partial underneath view.

The machine in the illustrated embodiment consists of an elevated baseplate 11 supporting a passageway formed by two guide strips 12*a* and 12*b* attached to said base plate, and extended by opposing horizontal pressure arms 15 and 16 pivoted to base 11 at pivots 17 and 18 and dual tape dispensing assemblies.

The pressure arm 15 comprises a cover portion 21 and a lower portion 21*b* hinged together by hinge 21*a*. Pivoted to the lower surface of cover portion 21, by means of pivot 27*a*, is a knife supporting arm 27 having a depending knife 29, an abutting edge, and a spring 19 connected between said supporting arm and pin 27*b*.

Similarly, pressure arm 16 comprises an upper portion 22 and a lower portion 22*b* hinged together by hinge 22*a*. Pivoted to the lower surface of cover portion 22 by means of pivot 28*a* is a knife supporting arm 28 having a depending knife 30, an abutting edge and a spring 20 connected between said supporting arm and pin 28*b*.

The lower portion 21*b* of pressure arm 15 is provided with a recess 31 to receive and allow unobstructed movement to knife supporting arm 27, and a recess 33 to receive and allow unobstructed movement to depending knife 29 when said cover portion 21 is folded down over lower portion 21*b* at hinge 21*a*.

In the same manner, the lower portion 22 of pressure arm 16 is provided with a recess 32 to receive and allow unobstructed movement to knife supporting arm 28, and a recess 34 to receive and allow unobstructed movement to depending knife 30 when said cover portion 22 is folded down over lower portion 22*b* at hinge 22*a*.

The lower portion 21*b* of pressure arm 15 is also provided with a horizontal obliquely transverse tape guide slot 23 at knife level terminating in said passageway and providing a tape lead support 25 beyond the end of said slot.

The lower portion 22*b* of pressure arm 16 is also provided with a horizontal obliquely transverse tape guide slot 24 at knife level terminating in said passageway and providing a tape lead support 26 beyond the end of said slot.

The dual tape feeding assembly consists of a pair of spaced tape holders pivoted to the base 11. Mounted on tape holder 42 is a roll of pressure sensitive tape 13, whose free end 13*a* is threaded through tape guide slot 23 and terminated at the end of tape lead support 25. Mounted on tape holder 43 is a roll of pressure sensitive tape 14 whose free end 14*a* is threaded through tape guide slot 24 and terminated at the end of tape lead support 26.

In the bottom of the base plate 11 is a recess 41 provided with slots 35 and 36. Extending through these slots are pins 37 and 38 which are attached to the ends of the lower portions 21*b* and 22*b* of arms 15 and 16. Connecting pins 37 and 38 together is a spring 39.

The outward movement of arms 15 and 16 on pivots 17 and 18 is limited by the length of slots 35 and 36.

To prepare the machine for operation, the top portions 21 and 22 of the pressure arms are raised on hinges 21*a* and 22*a* exposing the tape guide slots 23 and 24.

The pressure sensitive tape 13*a* is unreeled from reel 13, threaded through tape guide slot 23 and terminated on the tape lead support 25. Likewise tape 14*a* is unreeled from reel 14, threaded through tape guide slot 24 and terminated on tape lead support 26. This results in the lead ends of the tapes extending into the guide channel with their adhesive sides exposed in the channel, one on each side of the channel.

The top portions 21 and 22 are then closed down on hinges 21*a* and 22*a*, thus placing the knife supports 27 and 28 with their depending knives 29 and 30 into operating position at tape level, the abuting edges of said holders extending into said channel.

In operation a predetermined number of packages of cigarettes 40 are assembled face to face and positioned on end, the sides of the packages forming substantially straight lines 40*a* and 40*b*. The operator then moves array 40 on end, face of the leading package forward along the upper surface of base 11 into the passageway, formed by guide strips 12*a* and 12*b* and extended by the feed arms 15 and 16. The array is guided between the pressure feed arms 15 and 16 and tends to separate them.

As the forward face of the leading package enters between the arms 15 and 16, it also contacts the abutting edges of the knife holders 27 and 28, forcing them out of the channel and putting tension on associated springs 19 and 20.

As the rear face of the last package passes through to a point beyond the ends of the abutting edges, the knife holders 27 and 28 now under tension of springs 19 and 20 are abruptly released allowing the knives 29 and 30 to snap instantly back into the channel, cutting tapes 13*a* and 14*a*, allowing a lead edge of each tape to remain exposed in the channel ready for the next application.

While the preferred embodiment of my invention has been described in detail, it will be understood that I do not wish to be limited to the particular construction set forth, since various changes in the form, material, proportions, and arrangements of parts, and in the details of construction may be resorted to without departing from the spirit and scope of the invention, or destroying any of the advantages contained in the same, heretofore described and defined in the following claims.

I claim:

1. A machine for applying strips of pressure sensitive adhesive tape to the opposite sides of assemblies of objects comprising: a base supporting a passageway formed by opposing inwardly pressing horizontal pressure feed arms, and dual tape dispensing assemblies for pressure sensitive tape; each said horizontal feed arm having a recess, said feed arms being spring loaded adjacent the distal end and having a pivoted horizontal spring actuated cutting arm storeable in said recess; said cutting arm having a package abutting edge, an attached depending knife positioned at the end of said cutting arm, and a knife actuating spring connected to said feed arm; each feed arm being pivoted to said base at its proximal end and enclosing a horizontal tape guide slot cooperable with a said dispensing assembly, said slot being spaced from said base at knife level and terminating in said passageway adjacent to the end of said cutting arm, providing a lead tape support between the end of said slot and said knife, said cutting arms being adapted to be forced out of said passageway by direct contact with said assembly of objects moving as a unit between said feed arms, and adapted to be released for entry into said passageway by said assembly moving as a unit completely through said passageway, said release operating said cutting arms, said base, said feed arms and said cutting arms being in horizontal planes.

2. A machine for applying pressure sensitive tape to two opposite sides of a group of similar objects, comprising in combination a pair of horizontal spaced inwardly pressing opposing spring-loaded pivoted guide arms containing recesses, mounted on a base and forming a three-sided passageway with the base, the distance between and adjacent the movable ends of said guide arms being less than the width of said objects, a pair of horizontal spaced inwardly pressing opposing spring-loaded pivoted carrier arms each mounted on one of said guide arms, each of said carrier arms having a depending knife attached, and a separate continuous strip of pressure sensitive tape having a leading edge adjacent the passageway side of each guide arm; the combined pressure of said spring-loaded guide arms and said spring-loaded carrier arms pressing said tape against the sides of said objects; said carrier arms being positioned above the level of said strips, said base, said guide arms, and said carrier arms being in parallel horizontal planes.

3. A tape applying machine comprising in combination a base plate, positioned guide strips, opposing guide arms, opposing carrier arms and a dual tape dispensing assembly, said guide strips being fastened to said base; each of said guide arms being pivoted at one end to said base; said guide arms being thrust towards each other and restrictively connected together by a spring at the other end, the distance between said ends being less than the width of the objects to be passed between them; said strips and guide arms forming an operating channel, each of said guide arms having a hinged cover portion and a lower portion, said cover portion having an upper surface and a lower surface; each of said carrier arms having an object abutting surface and being pivoted adjacent one end to said lower surface of said cover portion and connected to it by a spring pressing said abutting surfaces towards each other; each of said carrier arms having a depending knife attached; said lower portion of said guide arm being provided with horizontal obliquely transverse tape guide slots and recesses to receive and allow unobstructed movement of said carrier arms and depending knives; said horizontal dual tape assembly mounted on said base being positioned at same level as said guide slots, the combined pressure towards each other of said spring-loaded guide arms and said spring-loaded carrier arms pressing said tapes against the sides of objects passing between them.

References Cited in the file of this patent

UNITED STATES PATENTS

| | | |
|---|---|---|
| Re. 22,418 | Salfisberg | Jan. 11, 1944 |
| 2,052,903 | Stagmeier | Sept. 1, 1936 |
| 2,087,472 | Dyment | July 20, 1937 |
| 2,512,579 | Long | June 20, 1950 |